Aug. 6, 1929. R. N. KIRCHER Re. 17,398

DETACHABLE COVER FOR COOKING VESSELS

Original Filed Nov. 5, 1925

INVENTOR.
Ralph N. Kircher

BY W. F. Woodard

ATTORNEY.

Reissued Aug. 6, 1929. Re. 17,398

UNITED STATES PATENT OFFICE.

RALPH N. KIRCHER, OF WEST BEND, WISCONSIN, ASSIGNOR TO WEST BEND ALUMINUM COMPANY, A CORPORATION OF WISCONSIN.

DETACHABLE COVER FOR COOKING VESSELS.

Original No. 1,641,681, dated September 6, 1927, Serial No. 66,905, filed November 5, 1925. Application for reissue filed June 17, 1929. Serial No. 371,599.

The invention relates to cooking vessels and is more particularly directed to a detachable cover for a class of cooking vessels better known as waterless cookers, and has for its primary object the provision of locking means for preventing the cover of the boiler from being forced therefrom by the pressure of steam within the cooker.

A further object of the invention is to provide in combination with the improved locking means a novel form of construction of the seat on the top of the vessel which cooperates with the cover in securing a steam tight fit between the cover and the vessel.

A still further object of the invention is to provide a cooking vessel having a seat formed therein which is adapted to receive the cover in such a manner that when the locking means is released the cover can be removed without any effort and at the same time when the locking means is clamped will insure a steam tight fit between the cover and the vessel.

A further object of the invention is to provide an improved lock or clamping means which may be readily swung up out of its operative position onto the top of the cover so as not to interfere or hinder the removal of the cover from the cooking vessel.

A still further object of the invention is to provide an improved locking or clamping means which exerts a resilient tension in maintaining the cover snugly seated in the top of the vessel.

These and other objects are obtained by providing a construction and an arrangement of the various parts in the manner hereinafter described and particularly pointed out in the appended claims.

Referring to the drawings, Fig. 1 is a side elevational view of the vessel partly in cross section showing my improvement embodied therein.

Figure 1:
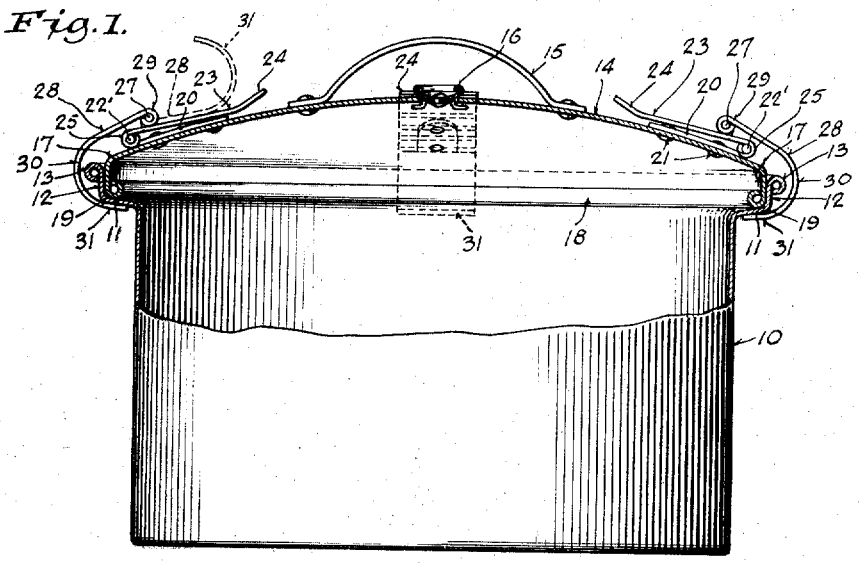
Figure 2:
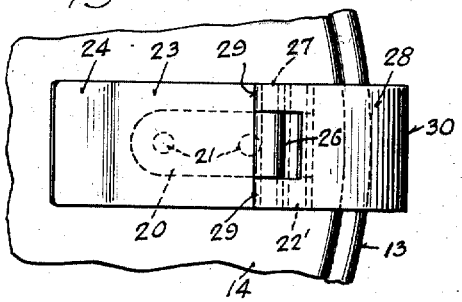
Fig. 2 is an enlarged top plan view of my improved locking or clamping member.

For the purpose of illustration I have shown my improved detachable cover and clamping means in connection with a waterless type of cooking vessel as shown at 10, the lower portion thereof being of the usual conventional form.

One of the novel features of my improved detachable cover comprises the provision of a seat or peripheral recess formed on the upper edge of the cooking vessel which permits the ready or easy removal of the cover from the vessel when the clamping members are disengaged or in their inoperative position but insures a snug or steam tight fit between the cover and the vessel when the locking or clamping means are in their operative or clamped position. This is accomplished by providing a seat or peripheral groove by bending the wall of the vessel outwardly and slightly upwardly as shown at 11, thence vertically upwardly as shown at 12 terminating the upper edge thereof in an annular bead 13 around the top of the vessel. This construction in addition to producing a suitable seat for the cover also reinforces or strengthens the upper part of the cooking vessel.

Mounted within the seat or peripheral groove in the top of the vessel is a dome-like cover 14 which is provided with the usual handle 15 and steam valve 16. The outer edge or the periphery of the cover 14 extends vertically downward from the dome-like top of the cover as shown at 17 a distance slightly greater than the vertical extension 12 of the vessel. The formation of the upstanding wall 12 surrounding the step and recess at the top of the vessel, and of the depending wall 17 on the edge of the cover, so that such walls 12 and 17 are of approximately the same height and engage each other over a widened area of contact, as shown in the drawing, contributes greatly to the snug or steam tight fit between the vessel and its cover, before referred to, and so conserves the steam and prevents its escape from the vessel when the cover is clamped in position theron, except through the steam valve or pressure relief vent 16. The lower end of the cover is rolled inwardly to form a reinforcing annular bead 18 about the lower edge of the cover and is adapted to engage the inclined portion or seat 11 of the vessel adjacent the vertical portion 12. The seat 11 and vertical portion 12 are connected together by a comparatively small fillet 19 so as to insure the contacting of the lower side of the annular bead 18 with the surface of the inclined portion of the seat 11 of the vessel adjacent the fillet 19.

For co-operating with my improved vessel and cover construction I have provided an improved form of clamping means which comprises a bracket 20 secured by means of rivets 21 adjacent the periphery of the cover. The bracket has its outer end rolled as shown at 22 to form a support for and to have secured therein a transverse bearing pin 22. Pivotally mounted on the bearing pin 22 is an actuating lever or clamping member 23 which has its free end turned upward as shown at 24 so as to afford a convenient grip for the operator in manipulating the clamping means. The actuating lever or clamping member 23 is pivotally secured to the pin 22 by having the bifurcated portions 25 bent downwardly and embracing the pin. The intermediate portion of said lever is bent upwardly and rolled as shown at 26 to form a support for and to retain therein a pin 27 which forms the pivotal support for the hook 28. The hook 28 is pivotally secured to the pin 27 by bifurcated portions 29 and has a portion thereof in the form of the arc of a circle as shown at 30 with the outer end thereof substantially flat as shown at 31 so as to engage the lower or outer side of the seat 11 of the vessel.

The clamping member 23, the hook member 28, and the bracket 20 are preferably formed as shown in the drawings of ductile and resilient sheet metal whereby they may be conveniently manufactured by suitable cutting and forming mechanisms and by forming the same of the material stated and in the manner and form described, the bracket, when secured to the lid of the cover will lie close thereto and the clamping member 23 pivotally connected therewith, will also, in its locking or closed position, lie close to the top of the vessel cover and upon the top of the bracket 20. Thus, when the cover is in position on the vessel with the clamping members in locking or closed position, the vessel including the cover and clamping members presents a neat appearance as all the locking parts lie close to the top of the cover as shown in Fig. 1 of the drawing, so that the vessel presents a neat and attractive appearance with the cover thus locked in position on the top of the vessel in a permanent and secure manner that will permit the vessel to be carried by the cover handle 15 without any danger of separation of the cover and vessel, if it is desired by the operator to so carry it.

Figure 4:
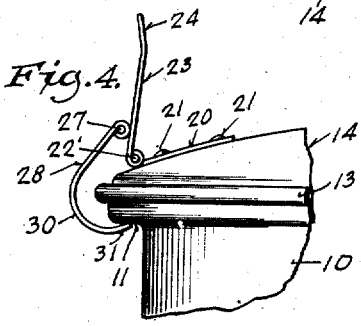
Fig. 4 is a fragmentary side elevational view showing my improved locking or clamping member in an intermediate position or in a position previous to clamping or securing the cover to the vessel.

From the above it will be noted that by reason of the pivot of the hook 28 being mounted eccentrically with respect to the pivot 22 of the lever or clamping member 23 that as said lever is actuated from the position shown in Fig. 4 to the full line position shown in Fig. 1, that the pivot 27 of the hook 28 will pass dead center and thereby resiliently clamp the detachable cover in such a manner that the annular bead 18 of the cover is pressed into engagement with the seat 11 of the vessel. It will also be noted that by reason of the construction of the hook 28 a resilient pressure is exerted by the clamp in retaining the cover in its seat on the vessel.

Figure 3:
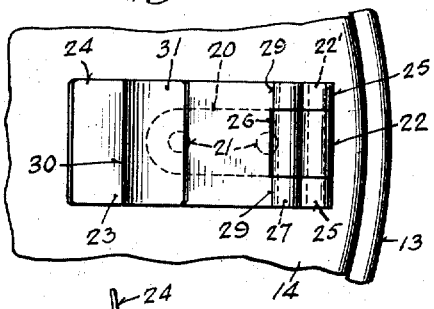
Fig. 3 is an enlarged top plan view of my improved locking or clamping member swung into its inoperative position or in a position so as not to interfere with the removal of the cover from the vessel.
Figure 5:
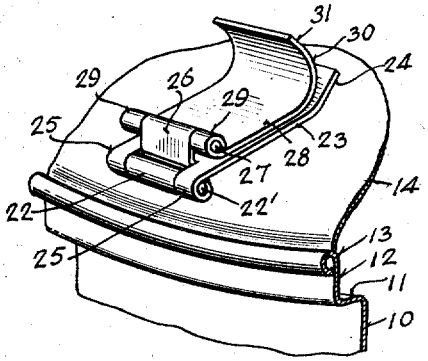
Fig. 5 is a perspective view showing the details of construction of my improved clamping device.

In the actual use of my improved detachable cover I have found it convenient to use four such clamps arranged substantially at 90 degrees about the periphery of the cover, but it will of course be understood that a more or less number of these clamping devices may be conveniently employed. It will further be noted that when it is desired to remove the cover from the cooking vessel after the clamping member or lever has been actuated to disengage the hook from its clamping or locked position that the lever and hook may be swung into inoperative position or the position shown in dotted lines in Fig. 1 (which is the same position as shown in Fig. 3) in which position the clamping means is swung up on top of the cover and when in this position the cover may be readily removed without the clamping member interfering with its removal.

While in the above specification I have described one embodiment which my invention may assume in practice, it will of course be understood that various modifications may be made without departing from the spirit and scope of the invention as expressed in the following claims.

What I claim as my invention and desire to secure by Letters Patent is:

1. In combination with a metal pressure cooking vessel having a bottom and side walls and a recess formed in the top of said vessel by bending the metal of the walls outwardly to form a seat, thence upwardly to form an upstanding vertical wall, of a detachable cover mounted in the seat in said vessel, the edge of the cover closely engaging the upstanding vertical wall, a clamping member pivotally mounted on said cover, and having a hook adapted to engage the underside of the seat of said vessel for detachably clamping said cover to said vessel.

2. In combination with a metal pressure cooking vessel having a bottom and side walls and a recess formed in the top of said vessel by bending the metal of the walls outwardly to form a flat seat, thence upwardly to form an upstanding vertical wall, of a detachable cover mounted in the seat in said vessel, the cover having a depending wall of approximately the height of the upstanding vertical wall to increase the area of contact between the said walls, a clamping member pivotally mounted on said cover, and a hook pivoted to said clamping member having the free end thereof flattened so as to engage the flat surface of the outer side of the seat of said vessel for clamping said cover to said vessel.

3. In combination with a metal pressure cooking vessel having a bottom and side walls and a recess formed in the top of said vessel by bending the metal of the walls outwardly to form a seat, thence upwardly to form an upstanding vertical wall, of a detachable cover mounted in the seat in said vessel, the cover having a depending wall of approximately the height of the upstanding vertical wall to increase the area of contact between the said walls, a plurality of brackets secured in spaced relation about the periphery of said cover, actuating levers pivoted to said brackets, and hooks pivoted to and eccentrically with respect to the pivot of said actuating levers whereby the actuation of said actuating levers locks the pivot of the hook past dead center thereby detachably securing said cover to said vessel.

4. In combination with a pressure cooking vessel having a bottom and side walls and a seat formed adjacent the top of said vessel by bending the material of the walls outwardly to form the seat, thence vertically to form an upstanding wall, a detachable cover mounted on said seat, the cover having a depending wall of approximately the height of the upstanding vertical wall to increase the area of contact between the said walls, a clamping member pivotally mounted on said cover, and a resilient hook pivoted to said clamping member and adapted to engage the underside of the seat of said vessel for detachably clamping said cover to said seat.

5. In a locking device for a cooking vessel having a detachable cover, a bracket mounted on said cover, a clamping member having bifurcated hinge portions pivotally connected to said bracket, a hinge portion extending laterally from said member intermediate said bifurcated portions, and a resilient hook pivoted to said last mentioned hinge portion and engageable with said vessel for clamping said cover thereto.

6. In a locking device for a cooking vessel having a detachable cover, a bracket mounted on said cover, a clamping member adapted to lie close to said cover and having at one end a hinge portion pivotally connected to said bracket, a hinge portion extending laterally from said clamping member intermediate its pivotal point and its free end, and a resilient hook pivoted to said last mentioned hinge portion and engageable with said vessel for clamping said cover thereto.

7. In a locking device for a cooking vessel having a detachable cover, a bracket mounted on said cover, a clamping member adapted to lie close to said cover and having bifurcated hinge portions adapted to receive and be pivotally connected to said bracket, a hinge portion formed integrally with said clamping member and extending laterally therefrom intermediate said bifurcated portions, and a resilient hook having a bifurcated end portion adapted to receive and be pivotally connected to said last mentioned hinge portion and its opposite end portion engageable with said vessel for clamping said cover thereto.

8. In a locking device for a cooking vessel having a detachable cover, a bracket mounted on said cover, a clamping member formed of relatively thin flat material pivotally connected to said bracket whereby a portion of the material of said relatively thin flat clamping member will lie close to and approximately parallel with the upper surface of said cover when the clamping member is in closed position, a hinge portion formed integrally with said clamping member and extending at an angle to the flat surface thereof, and a hook formed of resilient relatively thin material pivoted to the said last mentioned hinge portion and engageable with said vessel for clamping said cover thereto.

9. In a locking device for a cooking vessel having a detachable cover, a bracket on said cover, said bracket being formed of relatively thin sheet metal, a clamping member formed of relatively thin sheet metal provided with a hinge portion at one end thereof, a hinge portion on said bracket, a pivot pin for connecting said clamping member with said bracket, a hinge portion formed on said clamping member intermediate the said hinge connection thereof with said bracket and the free end of the clamping member, the last said hinge portion projecting from one of the flat surfaces of said clamping member, and a hook formed of resilient sheet metal pivotally connected with the last said hinge member of the said clamping member and engageable with said vessel for clamping said cover thereto.

10. In a locking device for a cooking vessel having a detachable cover, a bracket mounted on said cover, said bracket being formed of relatively thin sheet metal, a clamping member formed of relatively thin sheet metal provided with a hinge portion at one end thereof, a hinge portion on said bracket, a pivot pin for connecting said clamping member with said bracket, a hinge portion formed on said clamping member intermediate the said hinge connection thereof with said bracket and the free end of the clamping member, and a hook formed of resilient sheet metal pivotally connected with the last said hinge member of the said clamping member and engageable with said vessel for clamping said cover thereto.

11. In a locking device for a cooking vessel having a detachable cover, a bracket mounted on said cover, a relatively wide clamping member pivotally connected to said bracket and adapted to lie with one side close to said cover while in clamping position, and a hook engageable with said vessel for clamping said cover thereto, said hook being pivoted to said clamping member at a point intermediate the pivotal point and free end of the latter.

12. In a locking device for a cooking vessel having a detachable cover, a bracket mounted on said cover, a relatively wide clamping member pivotally connected to said bracket and adapted to lie with one side substantially parallel to said cover to reduce the extent of the vertical projection of said member while in clamping position, and a hook engageable with said vessel for clamping said cover thereto, said hook being pivoted to said clamping member at a point intermediate the pivotal point and free end of the latter.

In testimony whereof I have signed my name at West Bend, this 30th day of April, 1929.

RALPH N. KIRCHER.